US012062287B2

(12) United States Patent
Farnham, IV et al.

(10) Patent No.: US 12,062,287 B2
(45) Date of Patent: Aug. 13, 2024

(54) TRACKING AND ANALYSIS OF DRIVERS WITHIN A FLEET OF VEHICLES

(71) Applicant: Digital Ally, Inc., Lenexa, KS (US)

(72) Inventors: James W. Farnham, IV, Olathe, KS (US); Steven L. Phillips, Olathe, KS (US); Jason R. Troxel, Lee's Summit, MO (US); John Rumage, Olathe, KS (US)

(73) Assignee: Digital Ally, Inc., Lenexa, KS (US)

( * ) Notice: Subject to any disclaimer, the term of this patent is extended or adjusted under 35 U.S.C. 154(b) by 0 days.

(21) Appl. No.: 17/559,642

(22) Filed: Dec. 22, 2021

(65) Prior Publication Data
US 2022/0114894 A1 Apr. 14, 2022

Related U.S. Application Data

(63) Continuation of application No. 16/020,298, filed on Jun. 27, 2018, now Pat. No. 11,244,570, which is a
(Continued)

(51) Int. Cl.
| | |
|---|---|
| *G08G 1/00* | (2006.01) |
| *G06F 3/04817* | (2022.01) |
| *G06F 3/04842* | (2022.01) |
| *G06N 20/00* | (2019.01) |
| *G07C 5/00* | (2006.01) |

(Continued)

(52) U.S. Cl.
CPC .......... *G08G 1/20* (2013.01); *G06F 3/04817* (2013.01); *G06F 3/04842* (2013.01); *G06N 20/00* (2019.01); *G07C 5/008* (2013.01); *G07C 5/08* (2013.01); *G07C 5/0825* (2013.01); *G08G 1/0112* (2013.01); *G08G 1/0129* (2013.01); *G08G 1/0133* (2013.01); *G08G 1/04* (2013.01); *G08G 1/127* (2013.01)

(58) Field of Classification Search
CPC ........ G07C 5/008; G07C 5/08; G07C 5/0825; G08G 1/0133; G08G 1/0112; G08G 1/127; G08G 1/20; G08G 1/04; G08G 1/0129; G06F 3/04817; G06F 3/04842; G06N 20/00
See application file for complete search history.

(56) References Cited

U.S. PATENT DOCUMENTS

| | | | | |
|---|---|---|---|---|
| 2004/0243299 A1* | 12/2004 | Scaer | ...................... | G08G 1/202 |
| | | | | 701/522 |
| 2008/0125964 A1* | 5/2008 | Carani | ................... | G08G 1/127 |
| | | | | 701/408 |

(Continued)

Primary Examiner — Neil R Mikeska
(74) Attorney, Agent, or Firm — Erise IP, P.A.

(57) ABSTRACT

A system for tracking a fleet of vehicles and analyzing a driver associated with the fleet of vehicles. The system includes a monitoring engine for receiving information from a vehicle-tracking device associated with a vehicle of the fleet. A mapping engine displays, to a user, an icon indicative of an incident on a map. A video repository engine receives video data from a video camera associated with the vehicle and associates an incident video with the icon. A driver analysis engine obtains the incident information associated with a plurality of drivers and analyzes the incident information associated with the driver to generate a driver profile. The driver analysis engine compares the driver with corresponding drivers in the same and other fleets.

20 Claims, 13 Drawing Sheets

Related U.S. Application Data continuation of application No. 14/746,058, filed on Jun. 22, 2015, now Pat. No. 10,013,883.

(51) Int. Cl.
  *G07C 5/08* (2006.01)
  *G08G 1/01* (2006.01)
  *G08G 1/04* (2006.01)
  *G08G 1/127* (2006.01)

(56) References Cited

U.S. PATENT DOCUMENTS

| | | | |
|---|---|---|---|
| 2014/0045428 A1* | 2/2014 | Mohn | G07C 5/0858 455/41.2 |
| 2014/0143545 A1* | 5/2014 | McKeeman | H04L 63/08 713/168 |
| 2015/0066557 A1* | 3/2015 | Lichti | G06Q 10/06311 705/34 |
| 2015/0081162 A1* | 3/2015 | Mitchell | G06Q 10/08 701/32.4 |
| 2015/0256808 A1* | 9/2015 | MacMillan | H04L 65/762 348/43 |
| 2016/0066085 A1* | 3/2016 | Chang | H04R 3/00 381/122 |
| 2016/0360160 A1* | 12/2016 | Eizenberg | H04N 23/661 |

* cited by examiner

FIG. 8

Driver Fleet Safety Overview (This Month)

| Driver | Branch | Risk Grade | EPM | ITPM | Idle Time | ATU Accel | ATU Brake | PSV | VEDR Collision | VEDR Cornering | VEDR Vertical | VEDR Accel/Brake | VSTE | Miles Driven |
|---|---|---|---|---|---|---|---|---|---|---|---|---|---|---|
| Filter | | ▶ | | | | | | | | | | | | |
| 1 Totals | | | | | 520 min. | 416 | 426 | 98 | 18 | 0 | 0 | 7 | 1 | 10360 |
| 5 Doe, John | East Coast | 34.8 | 0.15 | 0.07 | 146 min. | 236 | 62 | 8 | 18 | 0 | 0 | 2 | 0 | 2228 |
| 4 Doe, Jane | East Coast | 30.0 | 0.25 | 0.19 | 374 min. | 180 | 283 | 34 | 0 | 0 | 0 | 5 | 1 | 1984 |
| 2 Average | | 10 | 0.06 | 0.04 | 74 min. | 59 | 61 | 14 | 3 | 0 | 0 | 1 | 0 | 1480 |
| 6 Doe, Jim | East Coast | 3.5 | 0.02 | 0.00 | 0 min. | 0 | 81 | 56 | 0 | 0 | 0 | 0 | 0 | 6148 |

FIG. 11

Branch Safety Overview This Month

| Branch | Risk Grade▼ | EPM | ITPM | Idle Time | ATU Accel | ATU Brake | PSV | VEDR Collision | VEDR Cornering | VEDR Vertical | VEDR Accel/Brake | VSTE | Miles Driven |
|---|---|---|---|---|---|---|---|---|---|---|---|---|---|
| Filter | | | | | | | | | | | | | |
| 4 East Coast | 0.0 | 0.26 | 0.05 | 78 min. | 170 | 173 | 26 | 2 | 0 | 0 | 1 | 0 | 1445.9 |
| 2 Average | 0 | 0.26 | 0.05 | 78 min. | 170 | 173 | 26 | 2 | 0 | 0 | 1 | 0 | 1446 |
| 1 Totals | | | | 78 min. | 170 | 173 | 26 | 2 | 0 | 0 | 1 | 0 | 1446 |

FIG. 12

TRACKING AND ANALYSIS OF DRIVERS WITHIN A FLEET OF VEHICLES

RELATED APPLICATIONS

This application is a continuation of U.S. patent application Ser. No. 16/020,298, filed Jun. 27, 2018, which is a continuation of U.S. patent application Ser. No. 14/746,058, filed Jun. 22, 2015, now U.S. Pat. No. 10,013,883, the disclosures of which are incorporated herein by reference.

BACKGROUND

1. Field

Embodiments of the invention relate to the tracking and analysis of drivers within a fleet of vehicles.

2. Related Art

Operators of fleets of vehicles desire tools to track and analyze their fleets. These fleets comprise a plurality of vehicles that are commonly associated. For example, a fleet of vehicles could be a commercial delivery service, a city police department, a state emergency response team, a military unit, or the like. Fleets require extensive costs for maintenance of the vehicles and training of the drivers. The fleet also represents a litigation liability for the operator due to the potential for property damage and injury that can be caused by the drivers. Therefore, operators desire detailed information on their drivers' activities while operating the vehicles.

Systems of the prior art utilize a vehicle-tracking device that is disposed in the vehicle. The vehicle-tracking device monitors the location and status of the vehicle and transmits this information to a central location. The central location may then populate a map with location and incident information and may also track incidents related to each driver.

These systems of the prior art have several drawbacks. First, any video of the incident is not associated with the incident in the system, or must be manually located and extracted. Second, incidents are difficult to review due to the lack of associated video. Third, the simple analysis performed by the systems of the prior art provides little meaningful information.

SUMMARY

Embodiments of the invention solve the above-mentioned problems by providing a system, a computer program, and a method of fleet tracking and analysis. Embodiments of the invention associate video data from a video camera with the incident. Embodiments of the invention then populate the map with segments of the video to aid in the review of the incident by a supervisor. Embodiments of the invention perform detailed analysis of the drivers by comparing the drivers against other drivers in the fleet, across other fleets, across other similar drivers of other fleets, etc. Embodiments of the invention therefore provide improved analytical tools for operators of the fleet.

A first embodiment of the invention is directed to a system for tracking a fleet of vehicles. The system includes a monitoring engine for receiving information from a vehicle-tracking device associated with a vehicle of the fleet, wherein at least a portion of said information is incident information that is associated with an incident detected by the vehicle-tracking device. The system also includes a mapping engine for displaying, to a user, an icon indicative of the incident on a map, wherein the icon is located on the map in a location corresponding to an incident location. The system also includes a video repository engine for receiving video data from a video camera associated with the vehicle, said video repository engine acquiring an incident video based upon at least a portion of said video data. The mapping engine associates the incident video with said icon displayed on the map such that the user may select and view the incident video.

A second embodiment of the invention is directed to a system for analyzing a driver associated with a fleet of vehicles. The system includes a monitoring engine for receiving information from a vehicle-tracking device associated with a vehicle of the fleet that is associated with the driver, wherein at least a portion of said information is an incident information associated with an incident detected by the vehicle-tracking device. The system also includes a driver analysis engine for obtaining the incident information associated with a plurality of drivers, wherein the driver is one of said plurality of drivers. The driver analysis engine also analyzes the incident information associated with the driver to generate a driver profile. The driver analysis engine also compares the driver profile for the driver with corresponding driver profiles for the plurality of drivers.

A third embodiment of the invention is directed to a system for tracking a fleet of vehicles and analyzing a driver associated with the fleet of vehicles. The system includes a monitoring engine for receiving information from a vehicle-tracking device associated with a vehicle of the fleet, wherein at least a portion of said information is incident information that is associated with an incident detected by the vehicle-tracking device. The system also includes a mapping engine for displaying, to a user, an icon indicative of the incident on a map, wherein the icon is located on the map in a location corresponding to an incident location. The system also includes a video repository engine for receiving video data from a video camera associated with the vehicle. The video repository engine acquires an incident video based upon at least a portion of said video data. The mapping engine associates the incident video with said icon displayed on the map such that the user may select and view the incident video. The system also includes a driver analysis engine for obtaining the incident information associated with a plurality of drivers, wherein the driver is one of said plurality of drivers. The driver analysis engine analyzes the incident information associated with the driver to generate a driver profile. The driver analysis engine also compares the driver profile for the driver with corresponding driver profiles for the plurality of drivers.

A fourth embodiment of the invention is directed to a non-transitory computer readable medium having a computer program stored thereon. The computer program instructs at least one processing element to perform the at least a portion of the steps discussed herein.

A fifth embodiment of the invention is directed to a computerized method for tracking a fleet of vehicles and/or analyzing a driver of the fleet of vehicles. The method comprises at least a portion of the steps discussed herein.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein:

FIG. 8 is an exemplary depiction of an incident review interface;

FIG. 11 is a chart diagram illustrating an exemplary analysis of the drivers within a fleet;

FIG. 12 is a chart diagram illustrating an exemplary analysis of the fleet; and

Figure 1:
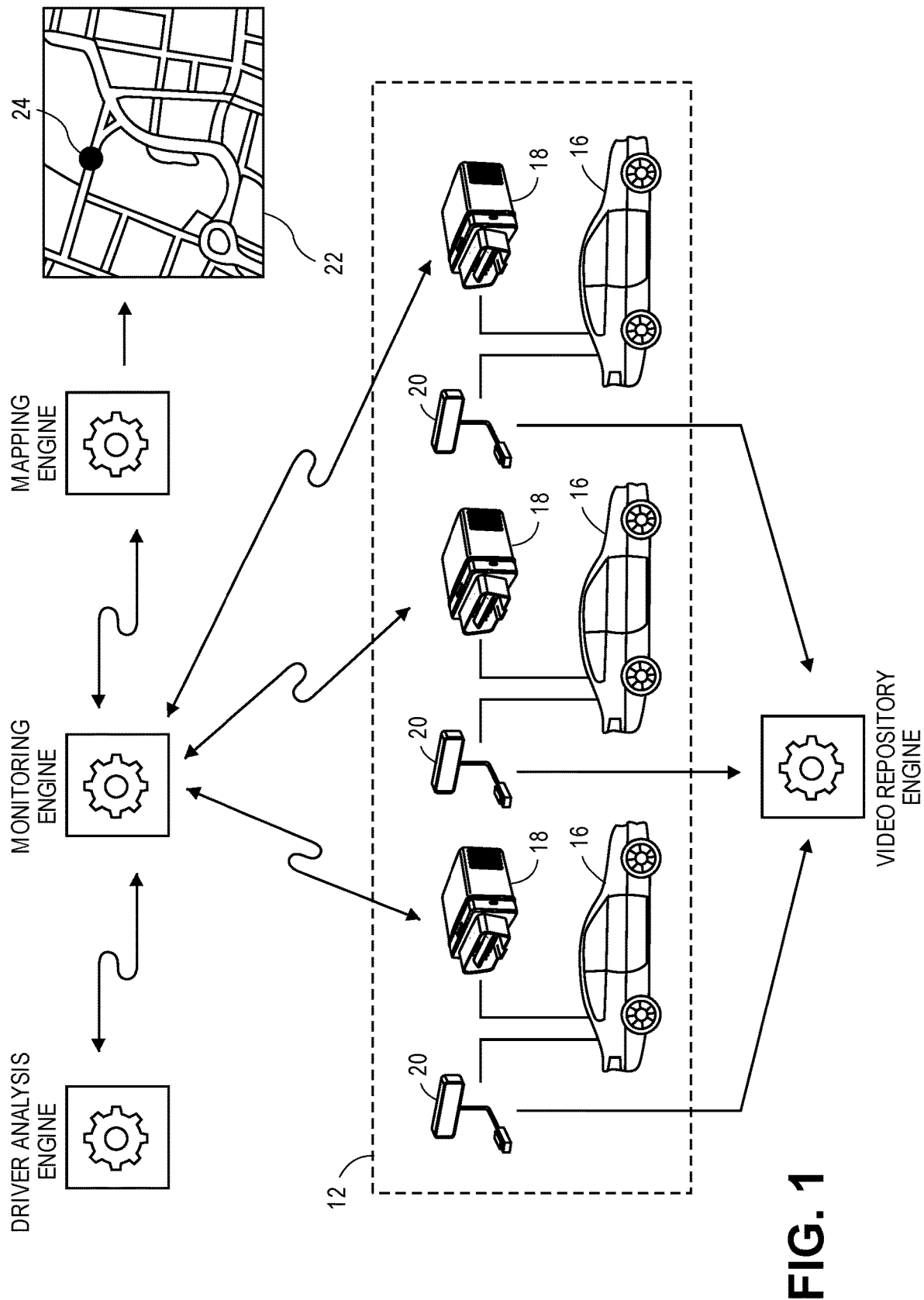
FIG. 1 is a system diagram illustrating the interactions of the various components of the system.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Embodiments of the invention are broadly directed to a system 10 for providing an operator, supervisor, or administrator of a fleet 12 with tools to maximize the safety, cost efficiency, and effectiveness of the fleet 12. Embodiments of the invention improve safety by identifying weaknesses and other characteristics of a driver 14 that can be improved to reduce the likelihood and severity of accidents. Embodiments of the invention improve cost efficiency by reducing fuel and other maintenance costs, providing exculpatory evidence in the case of litigation, etc. Embodiments of the invention improve effectiveness of the fleet 12 by recommending training or changes in behavior of the drivers 14.

Before discussing embodiments of the invention in depth, a few terms will be discussed so as to orient the reader. It should be noted, however, that the terms discussed herein provide exemplary discussions that should not be considered constraining on the construction of said terms.

As used herein, a "fleet" is an association of vehicles 16, machinery, or other devices. Vehicles 16 of the fleet 12 can be operated primarily on land, primarily in water, primarily in the air, primarily in space, etc. Typically, a fleet 12 is united in a common purpose, location, or control. For example, the fleet 12 may all be owned and/or operated by a single company, organization, or government entity. Examples of fleets 12 include a group of commercial shipping vehicles, a group of taxi cabs owned by a company in a certain city, a company's commercial shipping barges, a school district's school buses, law enforcement vehicles belonging to a certain municipality, a squadron of military airplanes, etc. For the sake of clarity, the fleet 12 will primarily be referred to as a fleet 12 of law enforcement vehicles throughout the remainder of this application; however, this is only exemplary.

As used herein, a "driver" is a driver 14 of the vehicle 16, an operator of the vehicle 16, a pilot of the vehicle 16, a captain of the vehicle 16, another crew member associated with the vehicle 16, etc. The driver 14 may be co-located with the vehicle 16, or may be remote. For example, a driver 14 in a fleet 12 of unmanned aerial vehicles may be located hundreds of miles away from the vehicle 16. Typically, the driver 14 is responsible for the movement of the vehicle 16 through its environment. Generally speaking, embodiments of the invention track and evaluate how the driver 14 moves the vehicle 16 through its environment.

Turning to the figures, general components associated with the system 10 are depicted in FIG. 1. At least one vehicle 16 and in embodiments, a plurality of vehicles, are associated in a fleet 12. Each vehicle 16 of the fleet 12 contains a vehicle-tracking device 18 and at least one video camera 20. Typically, the vehicle-tracking device 18 is located within or on the vehicle 16. The vehicle-tracking device 18 is discussed in more detail below. The at least one video camera 20 may be disposed within the vehicle 16 and oriented outward (such as in the direction of travel), disposed within the vehicle 16 and oriented inward (such as to observe the driver 14), etc.

As the vehicle 16 is operating, the vehicle-tracking device 18 is acquiring information regarding various aspects of the vehicle 16 such as location, speed, acceleration, the use of brakes, the use of blinkers, and the like. Abnormal behaviors or conditions may be detected by the vehicle-tracking device 18 (known as "incidents," discussed more below). The vehicle-tracking device 18 communicates with a monitoring engine. The vehicle-tracking device 18 sends information to the monitoring engine such as location, speed, incident information, etc. In embodiments of the invention, communication between the vehicle-tracking device 18 and the monitoring engine happens substantially in real time. A mapping engine generates a display of a map 22 on a display for the user. The mapping engine generates an icon 24 to display on the map 22. The icon 24 is indicative of a location and/or a status of the vehicle 16, based upon the information received by the monitoring engine from the vehicle-tracking device 18. The location of the icon 24 on the map 22, color, written information, and the like may be periodically or continuously updated based on newly received information from the vehicle-tracking device 18.

Upon the vehicle 16 traveling or returning to an upload location (such as a facility associated with the fleet 12), a video repository engine communicates with the video camera 20 disposed in the vehicle 16. The video repository engine receives, retrieves, or otherwise acquires video data from the video camera 20 in the vehicle 16. Typically, the video repository engine acquires the video data at a time later than the incident. For example, in the case of a law enforcement vehicle, when the law enforcement vehicle returns to the central law enforcement station, the video repository engine may communicate with the video camera 20 (or other device) to download the recorded video data. Alternatively, recorded video data may be transmitted to the video repository engine in substantially real time as the incident is occurring (e.g., "live streamed"), at a time later than the incident but prior to the vehicle 16 returning to the upload location, or in response to a user request to download the video data.

A driver analysis engine acquires data regarding the performance of the driver 14 from the monitoring engine. The driver analysis engine may also receive information from the video repository engine and/or the mapping engine. The driver analysis engine compares the information related to the driver's performance against historical information for the driver 14, established standards, and comparisons to other drivers 14. Based upon this analysis, the driver analysis engine may present information for a supervisor to review, recommend training, etc.

Figure 2:
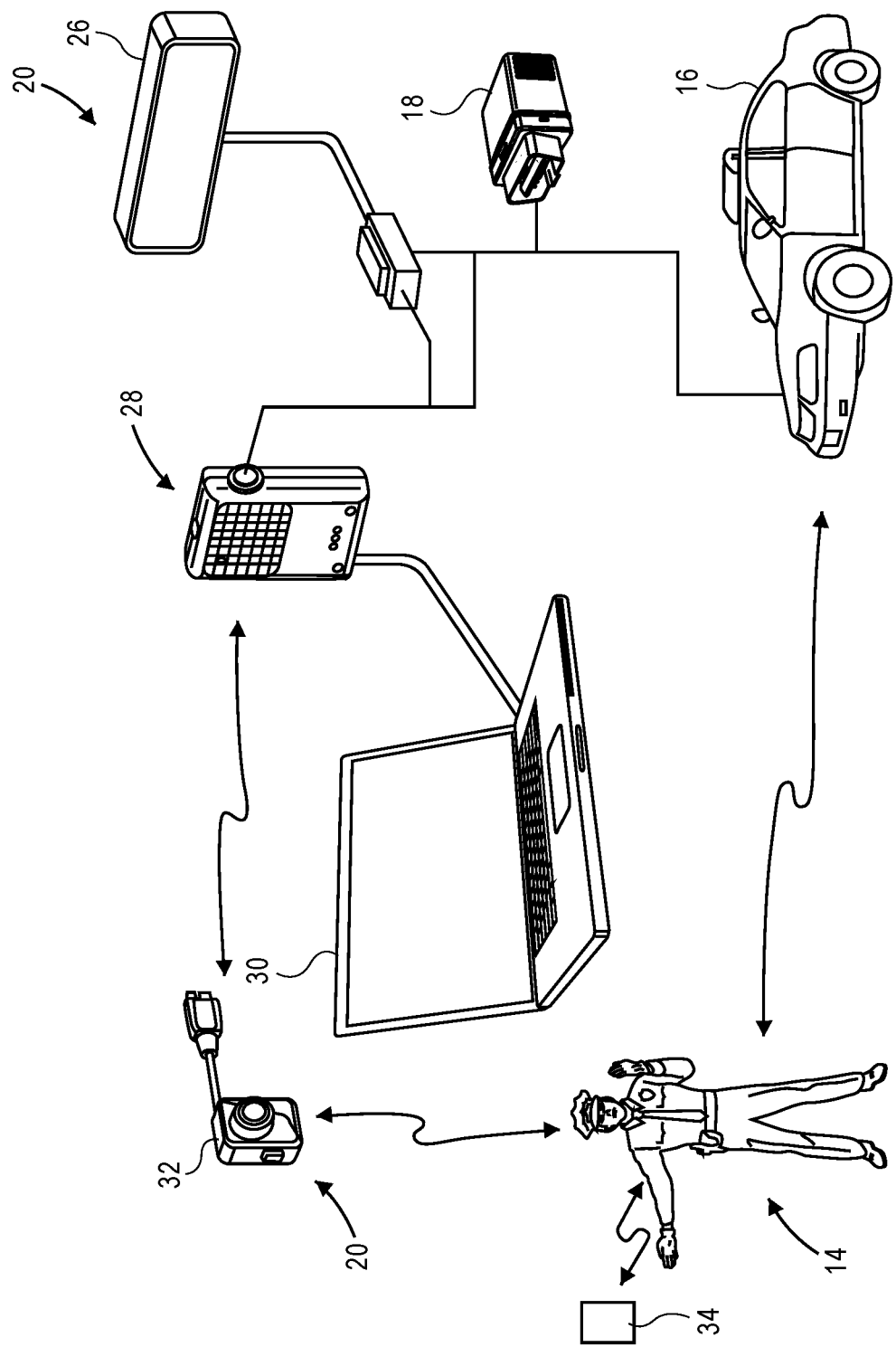
FIG. 2 is a system diagram illustrating the various hardware components associated with a vehicle.

FIG. 2 depicts various hardware components associated with the vehicle 16. It should be noted that FIG. 2 depicts the vehicle 16 as a law enforcement vehicle and the driver 14 as a law enforcement officer, but this is merely exemplary. Embodiments of the invention are directed to other vehicles 16 and drivers 14, such as those discussed above. Hardware components associated with the vehicle 16 may include the vehicle-tracking device 18, a video camera 20 that is a vehicle-mounted video camera 26, a recording device manager 28, a driver computing device 30, a video camera 20 that is a person-mounted video camera 32 worn by the driver 14, a proximity tag 34 worn by the driver 14, etc. Typically, the vehicle-tracking device 18, the vehicle-mounted video camera 26, the recording device manager 28, and the computing device are all installed in and powered by the vehicle 16. The person-mounted video camera 32 and proximity tag 34 are typically disposed on the driver 14 or other person. The person-mounted video camera 32 records events either as the driver 14 is operating the vehicle 16 and/or as the driver 14 is outside of the vehicle 16. The proximity tag 34 authenticates which driver 14 is operating the vehicle 16.

In some embodiments, the vehicle-tracking device 18 communicates only with the monitoring engine and not with any of the other components. In other embodiments, the vehicle-tracking device 18 communicates with the recording device manager 28 to send incident information, location information, and the like. In these embodiments, the recording device manager 28 may instruct the video camera 20 or other recording device to save the information from vehicle-tracking device 18. In addition, the video camera 20 or other recording device manager 28 may associate the information with the video data being recorded. In still other embodiments, the vehicle-tracking device 18 communicates directly with the video camera 20 or other recording device to provide incident information and/or current information about the status of the vehicle 16. In yet further embodiments, the vehicle-tracking device 18 communicates with the driver computing device 30, such that information from the vehicle-tracking device 18 is displayed to the driver 14 in the vehicle 16. This allows the driver 14 to make adjustments to driving habits to avoid future incidents, be able to discuss prior incidents with a dispatcher or supervisor while still driving, etc. The driver computing device may also display the map 22 to the driver 14.

It should be noted that while the vehicle-tracking device 18, the vehicle-mounted video camera 26, the recording device manager 28, and the driver computing device 30 are depicted in FIG. 2 as separate hardware components, in some embodiments of the invention various components are co-located in a single hardware component. For example, the vehicle-tracking device 18 may be located within the housing of the vehicle-mounted video camera 26, such as in the rear-view mirror of the vehicle 16 (as shown in FIG. 2). In some embodiments, there is no recording device manager or driver computing device 30 within the vehicle 16.

Figure 3:
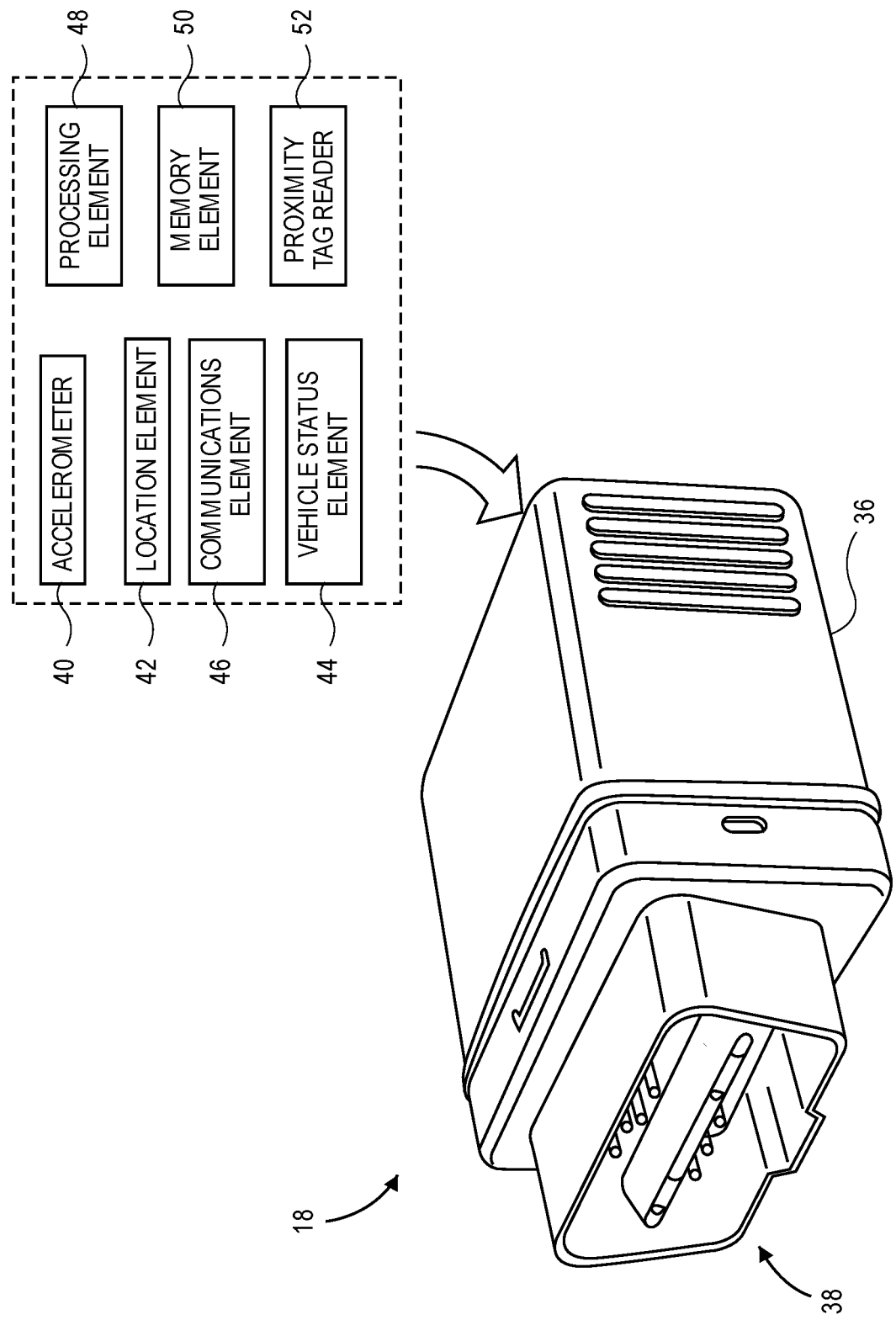
FIG. 3 is a perspective view of a first embodiment of a vehicle-tracking device.

The components of the vehicle-tracking device 18 are schematically illustrated in FIG. 3. Broadly, the vehicle-tracking device 18 comprises a body 36 and a vehicle interface 38. Within the body 36, the vehicle-tracking device 18 comprises an accelerometer 40, a location element 42, a vehicle status element 44, and a communications element 46. The vehicle-tracking device 18 may further comprise a processing element 48, a memory element 50, and a proximity tag reader 52.

The accelerometer 40 independently detects accelerations of the vehicle 16. The detected accelerations can be vertical (e.g. traveling over a bump or pothole too fast), horizontal forward (e.g. the driver 14 is accelerating or braking too quickly), and horizontal lateral (e.g. the driver 14 is taking turns at a high rate of speed). Accelerations that surpass a certain threshold are recorded and transmitted as incidents. The threshold may be fixed (e.g. a maximum safe acceleration rate of the vehicle 16), variable based upon location (e.g. within the posted speed limit, as determined by a map associated with the location element 42), variable based upon conditions (e.g. a very sudden deceleration or impact may be indicative of a vehicle crash), or the like.

The location element 42 determines the location of the vehicle 16. In some embodiments, the location element 42 utilizes the global positioning system (GPS) to determine location. The location element 42 determines the GPS location of the vehicle-tracking device 18 (and thereby the vehicle 16). The location element 42 transmits information indicative of the location to the processing element 48. The location information may then be stored on the memory element 50 of the vehicle-tracking device 18 and/or be transmitted to the recording device manager 28 and/or monitoring engine via the communications element 46. The location element 42 may also determine and record the time of the incident. This information can, like the incident information and other data, be further saved as video meta-data, as described above. The location information and time information provide further authentication to the incident information.

The vehicle status element 44 interfaces with the vehicle 16 via the vehicle interface 38 and an on-board diagnostics (OBD) port in the vehicle 16 to determine various statuses of the vehicle 16. For example, the vehicle status element 44 may determine when and if the brakes are applied, the blinker is engaged, the engine is running, the headlights are on, the gas pedal is depressed, etc. The vehicle status element 44 may also determine levels and warnings displayed in the vehicle 16, such as the "check engine" light, the fuel level, the emergency brake, etc. The vehicle status element 44 provides operating information such as idle time, travel time, working time, etc. In some embodiments, the vehicle status element 44 stores this information. In some embodiments, the vehicle status element 44 records this information in connection with an incident ("incident information"). In other embodiments, the vehicle status element 44 records all of this information for later use and/or communicates at least a portion of the information to the recording device manager 28 for association with the recorded video data.

The communications element 46 of the vehicle-tracking device 18 transmits incident information and other information to the monitoring engine. In some embodiments, the vehicle-tracking device 18 sends continuous or substantially continuous information to the monitoring engine regarding the vehicle's location. In some embodiments, the vehicle-tracking device 18 sends incident information regarding an incident detected by the vehicle-tracking device 18. In still other embodiments, certain incidents are communicated if they are above a threshold severity. For example, the communications element 46 may send incident information to the monitoring engine for vehicular accidents and vehicle breakdowns but will not send incident information for other unsafe driving incidents.

In some embodiments of the invention, the communications element 46 is communicatively linked to the recording device manager 28 and/or the driver computing device 30, such that messages can be sent therebetween. In some embodiments, the communications element 46 is also communicatively coupled, either directly or indirectly, with one or more other elements of the system 10. In addition to the incident information, the vehicle-tracking device 18 may transmit information indicative of a status. The status could include information such as vehicle-tracking device power on, vehicle power on, vehicle driving, error detected, error not detected, name of the driver 14 (based, in some embodiments, upon the proximity tag system discussed below), one or more identifiers (such as model number or serial number) associated with vehicle-tracking device 18, etc. All of this information can be stored as metadata for video recorded by one or more video cameras 20, or displayed in real time by one or more displays associated with the system 10.

The communications element 46 of the vehicle-tracking device 18 may be wirelessly connected to the recording device manager 28, the driver computing device 30, and/or the monitoring engine. The communications element 46 transmits the incident information and/or status substantially in real time (as defined below). Typically, the communications element 46 will operate via the mobile broadband network, Bluetooth technology, Wi-Fi technology, or the like. The communications element 46 may alternatively or in addition be connected via a communications wire to the recording device manager 28, the driver computing device 32, and/or video camera 20.

The incident information may be stored in metadata of the recorded video data from the at least one video camera 20. In some embodiments, the storage of the metadata may be done in substantially real time as the vehicle 16 is operating. In other embodiments, the storage of the metadata is performed automatically or semi-automatically after the vehicle 16 returns to the upload location, discussed below.

Metadata associates one set of data with another set of data. The metadata may be embedded in the captured video data, stored externally in a separate file that is associated with the captured video data, otherwise associated with the captured video data, or all of the above. Embedding the incident information into the same file with the captured video data can be advantageous because it allows the metadata to travel as part of the data it describes. In some such embodiments, metadata is associated with a particular frame or frames of the video data. This is advantageous where, for example, the same video file contains more than one incident. In other such embodiments, the metadata is associated with the video file as a whole. Externally stored metadata may also have advantages, such as ease of searching and indexing. The metadata may also be stored in a human-readable format, such that a user can access, understand, and edit the metadata without any special software. Some information stored in the metadata may be relatively static, such as a manufacturer name and model of the vehicle-tracking device 18, an identifier assigned to the specific vehicle-tracking device 18 by a law enforcement agency, etc.

The user may also selectively superimpose the incident information, the status and/or the relatively static information over the recorded video data. This may aid in the presentation of the video in a court or other judicial body. For example, if the vehicle 16 is a commercial vehicle, the operating company may present a video of a traffic accident in court with the relevant incident information and/or status superimposed thereon. The video, along with the superimposed status and/or incident information may be visually appealing and persuasive to a fact finder that the driver 14 was not at fault for the accident. As another example, in corrective training generated for the driver 14, embodiments of the invention may utilize actual video data from the driver's history with superimposed information to demonstrate certain information to the driver 14. Still further embodiments of the invention may include a driving simulation in which the driver 14 is invited to recreate the event and attempt to improve their performance. For example, if a driver 14 struck an animal while driving, the driving simulation may use or base a simulation on the associated video data (along with the superimposed information) and allow the driver 14 to recreate the event through simulation such that the driver 14 can be better prepared to avoid striking animals in the future.

Some embodiments of the invention comprise a proximity tag system for authenticating the devices, cameras, and drivers 14 associated with the incident. The proximity tag system comprises a plurality of proximity tags 34 and at least one proximity tag reader 52. Proximity tags 34 are any devices that radiate an identifying signal, herein referred to as the proximity tag identifier, that can be read by a corresponding reader such as the proximity tag reader. Proximity tags 34 can be active (meaning that they periodically broadcast their identifier), assisted passive (meaning that they broadcast their identifier only when interrogated by a signal from the reader), or passive (meaning that they have no power source and are illuminated by a signal from the proximity tag reader in order to radiate their identifier). Other forms of proximity tags are also possible. Proximity tag identifier may be preprogrammed into proximity tags 34, or may be field-programmable, such that the identifier is assigned by the user when the proximity tag 34 is deployed. One common form of proximity tag system is the radio-frequency identification (RFID) tag and the corresponding RFID reader. Another form of proximity tag system utilizes a challenge-response protocol to avoid the spoofing of a proximity tag identifier. An exemplary proximity tag system is described in U.S. patent application Ser. No. 14/517,368, filed Oct. 17, 2014, and entitled "FORENSIC VIDEO RECORDING WITH PRESENCE DETECTION," which is incorporated by reference herein in its entirety.

In embodiments of the invention, the driver 14 uses a proximity tag 34 that contains a proximity tag indicator specific to that driver 14 to authenticate the name, fleet 12, and/or status of the specific driver using the recording device manager 28 and/or the vehicle-tracking device 18. The proximity tag 34 may be located within a proximity card held by the driver, within the badge worn by the driver, on a watch or a belt worn by the officer, within a key used by the driver to start the vehicle, etc. There may also be a proximity tag 34 in the vehicle-tracking device 18 and/or the video cameras 20. The proximity tag reader reduces work to be performed at a later time to associate the recorded video data and incident information with the specific driver.

The recording device manager 28, as illustrated in FIG. 2, will now be briefly discussed. The recording device manager 28, such as a Digital Ally® VuLink®, controls and synchronizes various recording devices. For example, the recording device manager 28 links (via wireless communication, wired communication, or both) to the vehicle-tracking device 18, a person-mounted video cam era 32 on the driver 14, another person-mounted video camera 32 on another operator or passenger of the vehicle 16, a vehicle-mounted video camera 26 in the vehicle 16 oriented to observe events external to the vehicle 16, a vehicle-mounted video camera 26 in the vehicle 16 oriented to observe events internal to the vehicle 16, and/or the auxiliary computing device (referred to generically or individually as "the various recording devices"). An exemplary recording device manager is described in U.S. Pat. No. 8,781,292, issued Jul. 15, 2014, and entitled "COMPUTER PROGRAM, METHOD, AND SYSTEM FOR MANAGING MULTIPLE DATA RECORDING DEVICES," which is incorporated by reference herein in its entirety.

Typically, the recording device manager 28 detects when one video camera 20 begins recording, and then instructs all other associated devices to begin recording. The recording device manager 28 may also send information indicative of a time stamp to the various recording devices for corroborating the recorded data. In embodiments of the invention, the recording device manager 28 instructs all associated video cameras 20 to begin recording upon the receipt of a signal from the vehicle-tracking device 18 that an incident has been detected. This helps to ensure that the incident is captured as thoroughly as possible. For example, the vehicle 16 may have one forward-facing video camera that is continuously recording and multiple externally mounted video cameras facing in multiple directions that remain idle until an incident is detected. Upon the detection of an incident by the vehicle-tracking device 18, the recording device manager 28 instructs these secondary video cameras to begin recording, such that conditions around the vehicle 16 may be observed. The video cameras may also be continuously recording and dumping a set amount of time worth of video. The recording device manager 28 may instruct the video camera to store that amount of video data instead of dumping it.

Various methods of embodiments of the invention as performed by various engines will now be discussed. In some embodiments, a non-transitory computer readable storage medium having a computer program stored thereon may instruct at least one processing element to implement the steps of at least one of the described methods. The non-transitory computer readable storage medium may be located within a server device, the recording device manager 28, the vehicle-tracking device 18, and/or within a generic computing device.

Figure 4:
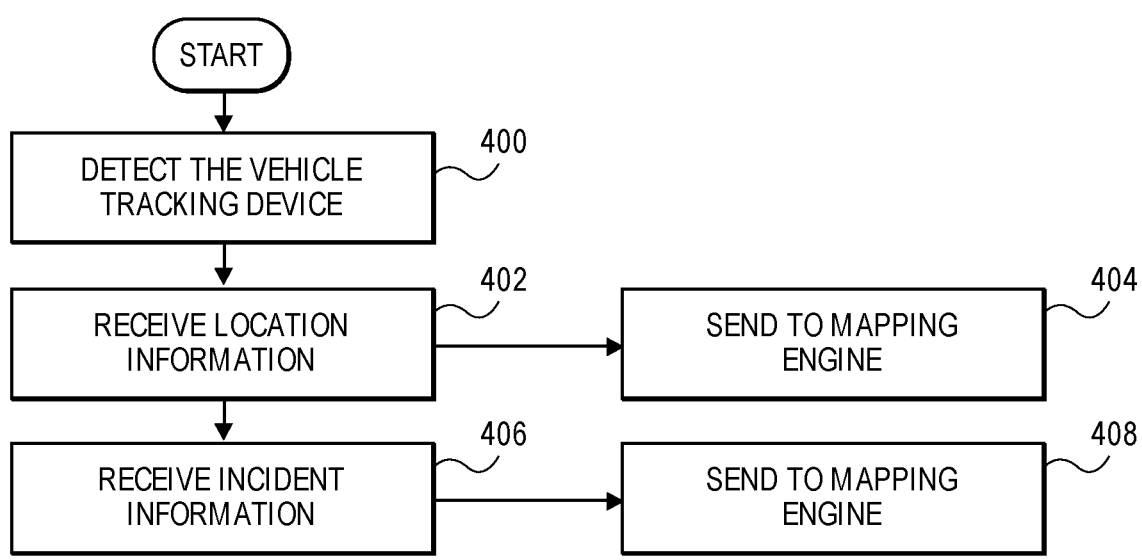
FIG. 4 is a flow diagram illustrating exemplary steps performed by a monitoring engine.

FIG. 4 depicts exemplary steps performed by the monitoring engine. Typically, the monitoring engine is located at a location associated with the fleet 12, such as a dispatching station, a headquarters location, or the like (though in some embodiments it is located in another place, such as a location associated with the administrator of the system 10).

In Step 400, the monitoring engine detects the vehicle-tracking device 18. Step 400 may be performed during the powering on of the vehicle-tracking device 18 before the vehicle 16 leaves the vicinity. Upon detection, the monitoring engine may request additional information from the vehicle-tracking device 18 such as a current status and/or location. It should be appreciated that the monitoring engine may detect and track many vehicle-tracking devices 18 simultaneously (of the same or multiple fleets 12).

In Step 402, the monitoring engine receives location information for the vehicle-tracking device 18. In Step 404, the monitoring engine sends this information to the mapping engine so that the mapping engine can populate and/or move the icon 24 associated with the vehicle 16.

In Step 406, the monitoring engine receives incident information from the vehicle-tracking device 18. In some embodiments, the received incident information is minimal. For example, the information may include that there is an incident, a location of the incident, and a type of incident, but without excessive details. This minimizes the amount of data transferred while still alerting the monitoring engine (and by extension an operator or dispatcher observing the monitoring engine and/or the map 22) of the incident. The type of incident may be determined by the vehicle-tracking device 18, the driver computing device 30, the recording device manager 28, or other component. The type of incident is indicative of the nature of the incident and/or the severity of the incident. Examples of types of incidents include speeding, harsh braking, rapid acceleration, harsh cornering, failure to use a vehicular system (such as the brakes, blinker, wipers, etc.) vehicular collision, vehicular theft, vehicular breakdown, tampering with the vehicle-tracking device 18, operation of the vehicle by an unauthorized driver, operation of the vehicle outside work hours, operation of the vehicle outside a certain geographic area, the passing of a certain time interval, the passing of a certain geographic waypoint, etc. The type of incident may also include a severity level of the incident. For example, speeding in excess of twenty miles per hour over the posted speed limit may have a classification such as "imminently dangerous speeding" or "speeding level 3." In some embodiments, the operator or dispatcher may request additional information from the vehicle-tracking device 18 if additional details are needed. In Step 408, this information is sent to the mapping engine for the creation or updating of the icon 24. In Step 410, the information is sent to the driver analysis engine for later analysis of the driver's performance.

Figure 5:
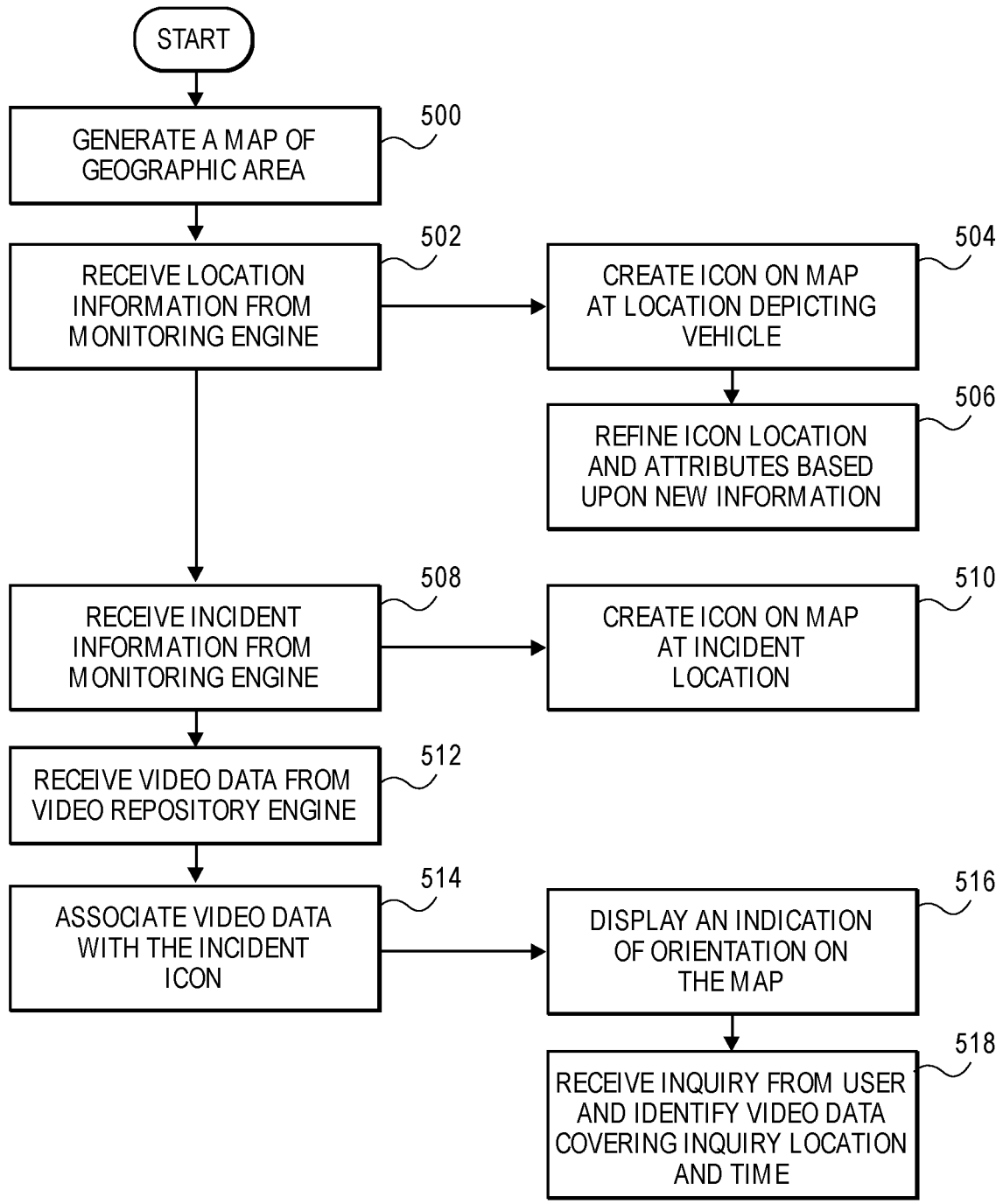
FIG. 5 is a flow diagram illustrating exemplary steps performed by a mapping engine.

FIG. 5 depicts exemplary steps by the mapping engine. Generally, the mapping engine receives the at least a portion of the information received by the monitoring engine and utilizes the information in populating the map 22 displayed to a user. In some embodiments, the user is a dispatcher or supervisor responsible for overseeing the fleet 12. In other embodiments, the user is an administrator that oversees the system 10 but has no direct oversight of the fleet 12. The map 22 may display on multiple displays, including to the driver 14, to all drivers of the fleet 12, to the supervisor, to the dispatcher, and/or to the administrator. The map 22 may be available on demand or continuously displayed.

In Step 500, the mapping engine generates a map 22 of the geographic area related to the incident or the area in which the vehicle 16 is traveling. The geographic area covered by the map 22 may also be dependent upon the geographic locations of the various vehicles 16 as reported (as discussed below). The geographic coverage area and/or dimensions may also change over time as the geographic area in which the vehicles 16 are located changes. For example, as a vehicle 16 moves off of the edge of the map 22, the map 22 may automatically adjust (e.g. zoom out or pan) such that all vehicles 16 remain visible on the map 22.

In Step 502, the mapping engine receives location information from the monitoring engine. The location information is indicative of the location in which the vehicle 16 is located. In Step 504, the mapping engine creates an icon 24 on the map 22 at a position associated with the position of the vehicle 16 (i.e. such that the icon 24 on the map 22 approximates the vehicle 16 on the ground). The icon 24 may have a corresponding color, shape, marking, or other indication that is indicative of the vehicle, vehicle type, and/or driver.

In Step 506, the mapping engine refines the location or other attributes of the icon 24 based upon updated information received by the mapping engine from the monitoring engine. For example, as the vehicle 16 moves through the area, the icon 24 is updated to depict an approximate current location. As another example, the icon 24 may begin presenting a first color, such as a green color. If the driver 14 experiences a first incident, the icon 24 may turn a second color, such as yellow, and if the driver 14 experiences a second incident the icon 24 may turn a third color, such as red. This allows the supervisor or dispatcher to quickly determine the quality of driving being exercised by the drivers 14 in the fleet 12 in real time.

In Step 508, the mapping engine receives incident information from the monitoring engine. In Step 510, the mapping engine creates an icon 24 at the geographic location associated with the incident. In some embodiments, the incident information includes location information. In other embodiments, the icon 24 is created at the current geographic location of the vehicle 16 associated with the incident. Typically, the icon 24 will remain static at the associated location, even after the vehicle 16 has moved to another location. This allows the dispatcher or supervisor to identify areas where incidents are common. The mapping engine may additionally or in the alternative generate a map 22 specific to the driver 14 that includes all incidents for a certain time period or specific geographic area.

In Step 512, the mapping engine receives video data from the video repository engine. In Step 514, the mapping engine associates the video data with the icon 24. The mapping engine may update or recreate the icon 24 to indicate that video data is available for this incident. For example, the icon 24 may display a small screen shot of the video on the icon 24 (either by default or on a mouse-over). The mapping may also present an option to the user to request additional video. For example, if the incident video data provided stops while the incident is still in progress, the user may request an additional amount of time of video (such as thirty seconds, one minute, two minutes, etc.). The mapping engine may then request the additional video data from the video repository engine, edit the incident video data to include the additional video data, and present the new video to the user.

The mapping may also display additional incident information to the user that was not immediately available when the icon 24 was created. For example, the vehicle-tracking device 18 may provide minimal incident information over the mobile broadband connection, such as driver involved, vehicle involved, type of incident, and location of incident. Later, upon return to the upload location, the mapping engine may receive more information about the incident, such as vehicle speed during the incident, accelerometer 40 readings during the incident, vehicle systems operating during the incident, and the like. This gives someone reviewing the incident with more information about the cause and fault involved in the incident. The user may also be presented with options to request additional incident information, such as conditions before or after the incident, weather conditions during the incident, the driver's shift hours for that day, etc.

In embodiments of the invention, Step 512 and Step 514 occur after the vehicle 16 has returned to the upload location. This is because transferring video over mobile broadband is typically slow and expensive. In other embodiments, the dispatcher or supervisor can initiate Step 512 and 514 while the vehicle 16 is still driving, as discussed below. For example, if the incident is a vehicular wreck, a shooting involving a law enforcement officer, or another emergency, the video data related to the incident may be vital in alleviating the situation. As a more specific example, if the driver 14 drives off of the roadway and down a ravine and cannot be located by rescue efforts, the dispatcher may select on the map 22 to have the recording device manager 28 or recording device upload the video associated with the incident remotely (because the slowness and expense of mobile broadband are less important in such a situation). As another specific example, if a law enforcement officer is shot and incapacitated by a suspect, the dispatch currently has no way to receive a video of the suspect to assist in his capture. Embodiments of the invention allow the dispatcher to receive the video, via a request made remotely through the mapping engine, and transmit the video (or a screenshot thereof) to the other officers in pursuit of the suspect. In performing these steps, the recording device manager 28 or recording device (which contains the video data) may utilize the communications element 46 of the vehicle-tracking device 18, an internal communications element, a smart phone associated with the driver 14 (via a Bluetooth connection), etc.

In embodiments of the invention, the video data includes orientation information. Orientation information may be derived from a compass element (not illustrated) in the video camera 20, a compass element in the vehicle 16, the direction of travel based on location data, etc. In Step 516, the mapping engine may provide an indication of the orientation of the video data. For example, the indication may be a cone shape in the orientation direction, a shaded area approximating the area covered by the video, etc. In some embodiments of the invention, in Step 518 the mapping engine analyzes the video data to determine a set of video data that covers an inquiry location at an inquiry time based upon the orientation data and a set of location information for the video data. In these embodiments, a user may be attempting to locate video regarding a certain inquiry location, such as the scene of a wreck or crime unrelated to the fleet. The user may enter an inquiry location and inquiry time into the mapping engine. The mapping engine may then analyze vehicles 16 of at least one fleet 12 near that inquiry location at that inquiry time and determine if any were oriented in a direction that may have potentially captured the inquiry time and location. The mapping engine may then present or request any potentially relevant video for review by the user.

As an example of this embodiment, a bank was robbed in the vicinity of a commercial shipping facility. As law enforcement officers are investigating the robbery, they ask the commercial shipping facility supervisor if any commercial shipping vehicles were coming into or out of the facility that may have potentially captured the bank robbers on video. The supervisor enters the location and time of the bank robbery into the mapping engine. The mapping engine analyzes the locations of the vehicles at that time in that vicinity and/or analyzes the location and orientation information associated with all available video data. The mapping engine then identifies one commercial shipping vehicle that had a video camera 20 oriented toward the bank at the inquiry time. The mapping engine then requests the relevant video from the video repository engine and presents the video to the supervisor. As another example, if a vehicle associated with the fleet becomes involved in a collision, the inquiry may determine whether there were any other vehicles in the vicinity that may have captured the collision on video. In some embodiments, the inquiry may search video data from other fleets to which the supervisor (or other user) may not have direct access. If a video is identified, the supervisor may request the video from a supervisor of that fleet.

Figure 6:
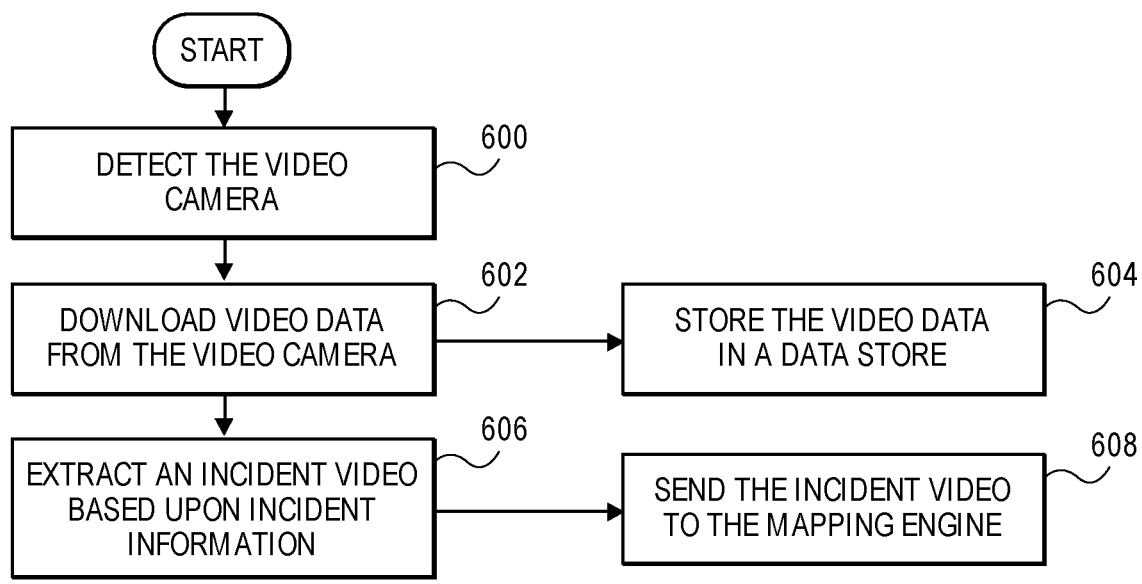
FIG. 6 is a flow diagram illustrating exemplary steps performed by a video repository engine.

FIG. 6 depicts exemplary steps of the video repository engine. The video repository engine generally receives and stores video data from the plurality of vehicles 16 in the fleet 12. The video data is then stored for a certain period of time for litigation and compliance reasons. Typically, the video repository engine is located at least in part at a facility associated with the fleet 12 or the system 10, known as the upload location. An exemplary video repository engine may operate in a hospital to download videos taken by ambulances after they return from retrieving a patient or at a law enforcement precinct to download videos taken by law enforcement vehicles after the vehicle is returned at the end of a shift. There may be more than one upload location associated with the fleet 12 and/or the system 10.

In Step 600, the video repository engine detects the video camera 20, the recording device manager 28, or the like. The connection may wireless (e.g. Wi-Fi technology, Bluetooth technology, or the like), wired (e.g. via a communications cable), or by the transfer of physical media (e.g. by the removal and manual transfer of a data store). Typically, the connection will be a wireless Wi-Fi connection. For example, as the vehicle returns to the vicinity of the upload location, the recording device manager 28, video camera 20, or recording device establishes a Wi-Fi connection with the video repository engine.

In Step 602, the video repository engine downloads video data from the recording device manager 28, video camera 20, or recording device. In embodiments of the invention, the video repository engine downloads all available video data that was created since the last download process. In other embodiments, the video repository engine may selectively download only certain portions of the video data. In Step 604, the video repository engine stores the video data in an associated data store.

In Step 606, the video repository engine extracts an incident video from the video data based upon the incident information. The incident information may be received from the monitoring engine, from the recording device manager 28, from the vehicle-tracking device 18, be embedded in the video data as metadata, or another source. For example, the video data may have associated metadata indicative of an incident during a certain time period of the video. The video repository engine may then extract that segment of video data, along with a certain period of time before and/or after the incident.

In Step 608, the video repository engine sends the incident video to the mapping engine such that the incident video may be associated with the icon 24. This allows the dispatcher, supervisor, driver 14, etc., to review the video in a convenient manner. The reviewer is not required to find the correct file and skip to the approximate location, as in other systems of the prior art. The user instead simply selects the icon 24 that has the incident video data already associated. Additionally, or in the alternative, the video repository engine may send the incident video to the driver analysis engine for review, analysis, and presentation to a person reviewing the driver's performance.

Figure 7:
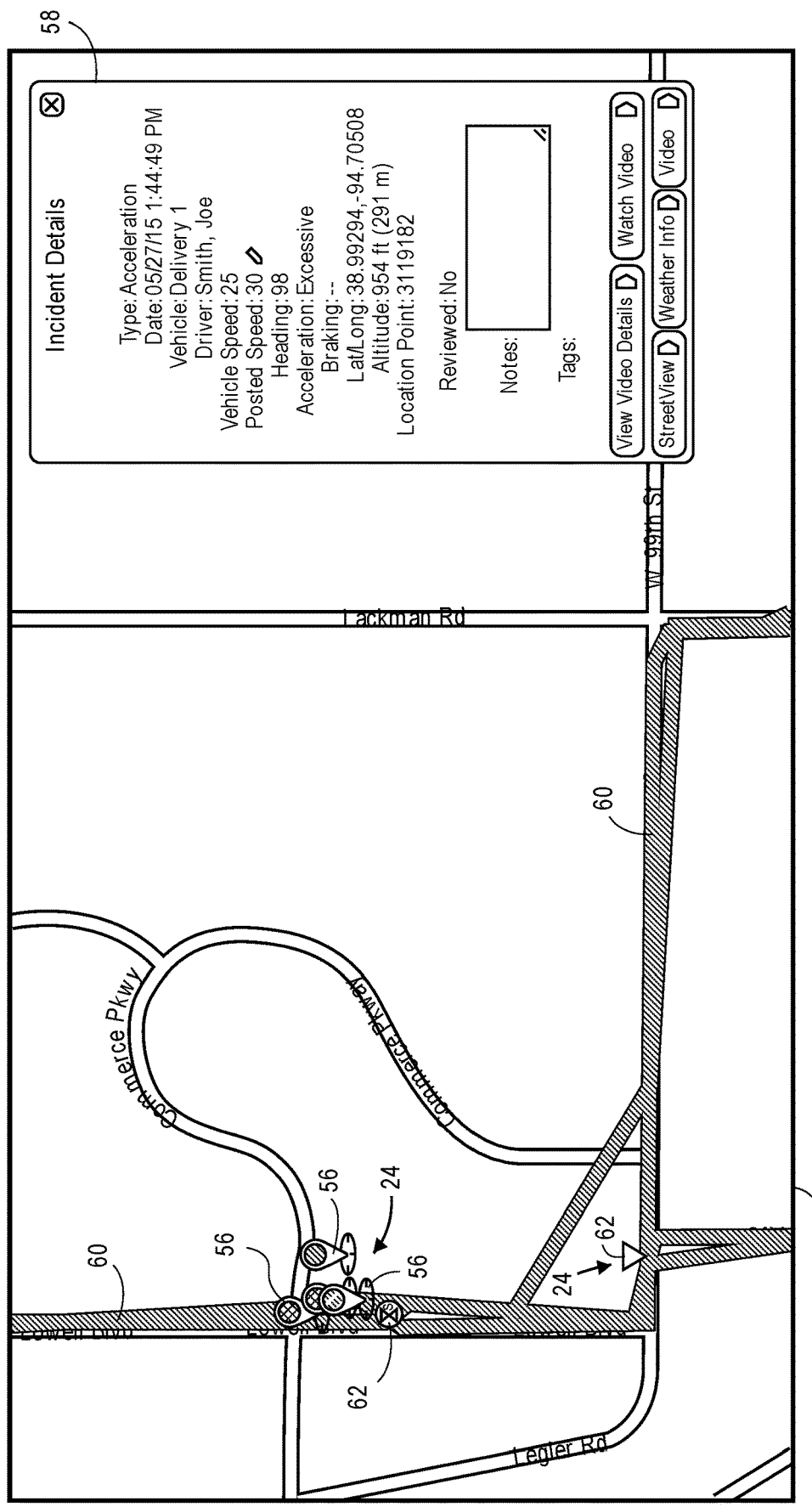
FIG. 7 is an exemplary depiction of a map with icons thereon.

FIG. 7 depicts an exemplary graphical user interface of the map 22. As illustrated, the map depicts various streets and other geographical markers. The map also depicts a plurality of icons 24. Some of the icons 24 are vehicle icons 56. Vehicle icons 56 depict a location of the vehicle in substantially real time (as defined below). The vehicle icon 56 may have a certain identifier such as a color, a pattern, an alphanumeric, or other identifier so that the user may know to which the vehicle 16 the vehicle icon 56 relates. The user may select the vehicle icon 56 to receive information about the current status of the vehicle, the associated driver 14 (if any), the history of incidents, the hours worked, the miles traveled, the jobs completed, etc. The information about the vehicle may be displayed in a vehicle details window similar to an incident details window 58 (discussed below) illustrated in FIG. 7.

As illustrated in FIG. 7, some of the icons 24 are vehicle tracks 60. The vehicle tracks 60 depict the approximate pathways through which a vehicle 16 has traveled within a certain time frame (e.g. the current day). The vehicle tracks 60 provide an easy reference for users to be able to see at a glance where the vehicles have traveled. For example, a user would be able to quickly and easy see if a certain delivery has been performed based upon the presence or absence of the vehicle track 60 in the vicinity of the location associated with the delivery. In some embodiments, the vehicle track 60 begins as transparent and then upon each subsequent passing of a vehicle over the vehicle track 60 the transparency is reduced incrementally until the vehicle track 60 is opaque. It should also be noted that the vehicle track 60 is only an approximation of the traveled location of the vehicle because the location of the vehicle is typically determined periodically. The user may select the vehicle track 60 to receive information about which vehicle 16 or vehicles have traveled in the area, the time for each vehicle 16 traveling in the area, the point of origin and or destination associated with the vehicle 16 traveling in the area, the next vehicle scheduled to pass through the area (if known), a street and city name associated with the area, an approximate address for the area, a speed limit associated with the area (if known), etc. This information may be displayed on a route details window similar to the incident details window 58 in FIG. 7.

As illustrated in FIG. 7, some of the icons 24 are incident icons 62. The incident icons 62 depict the geographic location associated with the incident. The incident icon 62 may include an indication of the type and/or severity level of the incident. The incident icon 62 may also include an indication of whether the incident icon 62 has an associated video, whether a video is pending (e.g. the vehicle has not yet returned to the upload location to upload the video, but the video will be added to the icon at that time), whether the video has not been requested (and may include an option for the user to request the video), etc. As some incidents occur over time and distance (such as speeding and excessive acceleration), the incident icon 62 may be associated with a start position, an intermediate position, and/or an ending position for the incident. In other embodiments, the incident icon 62 may be displayed as a vehicle track 60, but be set off from other vehicle tracks 60 by a different color, pattern, or opacity.

Figure 8:
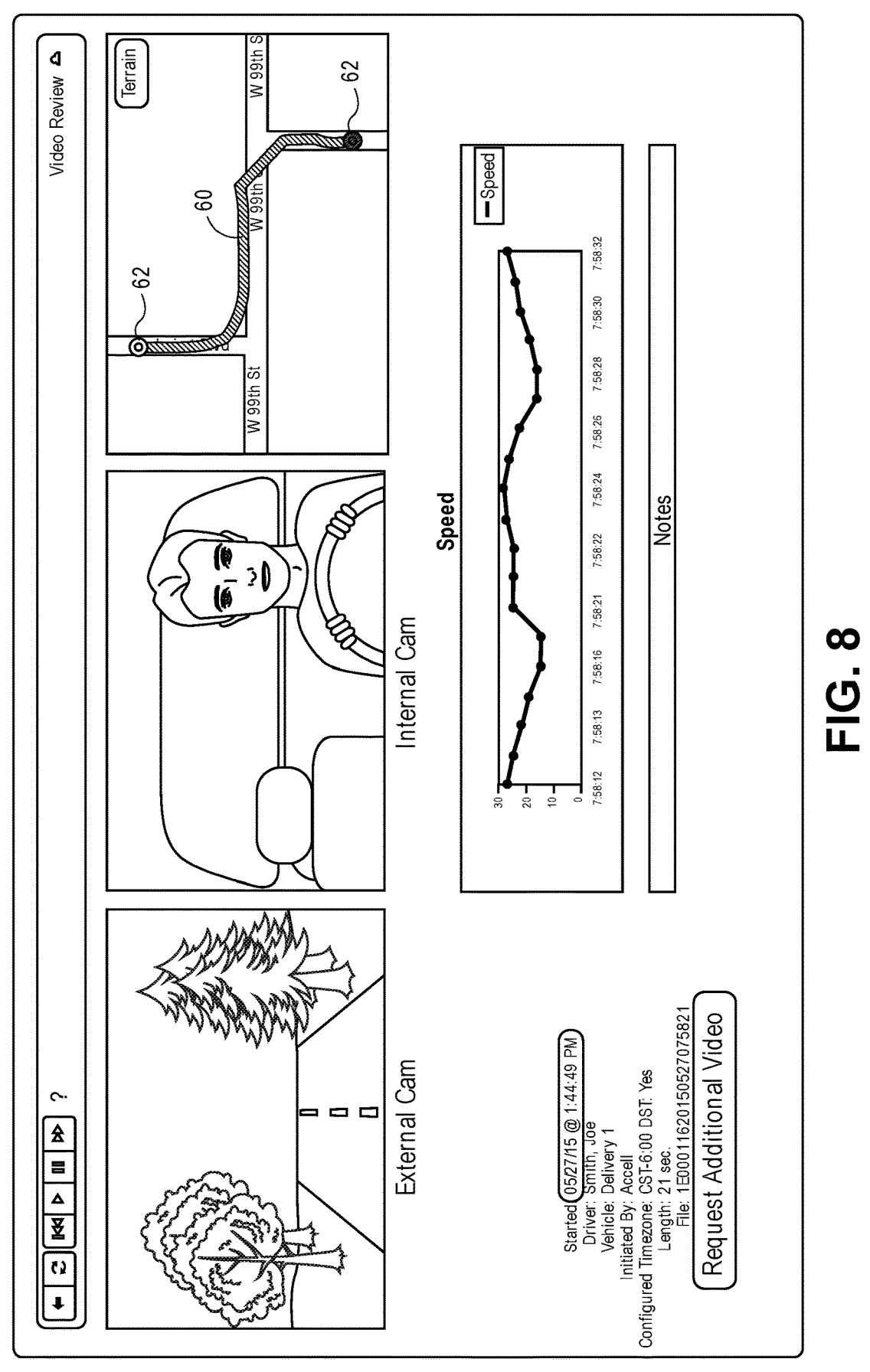

The user may select the incident icon 62 to display more information about the incident. An exemplary incident details window 58 is illustrated in FIG. 7. As shown, the exemplary incident details window 58 includes a type of incident, a date and time, a vehicle name, a vehicle driver name, the speed of the vehicle, the posted speed limit (either known from available map data or completed by the user), the heading at the time of the incident, a severity level for the acceleration, a severity level for the braking, a location, an altitude, a name for the location point, an indication of whether the incident video has been review, notes made by the reviewer (that may be entered directly on the incident details window 58 or from an incident review interface such as illustrated in FIG. 8), tags assigned (either by the system, the reviewer, or both). The exemplary incident details window 58 also presents options for the user to select. Among the exemplary options shown include an option to view the video details (which will bring up a screen such as the incident review interface of FIG. 8), an option to watch the video overlaid on the map, an option to view a street-view photograph from a third party resource (such as GOGGLE MAPS or the like), an option to view weather information associated with the incident (i.e. from the date, time, and location of the incident), and an option to view driver information (e.g. a driver profile).

FIG. 8 depicts an exemplary graphical user interface of an incident review interface. Typically, the reviewer and/or the driver will access the incident review interface in reviewing the incident. The incident review interface may be displayed upon selection of the incident icon 62, upon selection of the video details option on the incident details window 58, upon the video being uploaded and associated with the incident icon 62, etc. As illustrated the incident review interface includes video controls, an external camera video player, an internal camera video player, a map depicting the incident (including a start location, a vehicle track, and an end location), a summary of incident information, a graphical depiction of speed, and a section for notes to be entered or reviewed. The incident review interface may also include additional information such as that shown in FIG. 7, detailed information the status of various sensors in the vehicle, a display of the metadata associated with the video, a display of the accelerometer and braking over time, a display of all available vehicle information, etc.

In embodiments of the invention, the external camera video player and the internal video camera video player are populated with video data from their respective video cameras automatically. The video repository engine (as discussed above in Step 606) extracts the video data that corresponds with the incident information. The extracted video data is then displayed for review in the incident review interface (and/or on the map). Reviewing the video data along with the incident information provides a better understanding to the reviewer of the conditions and the actions taken by the driver. The video data may provide the reviewer with information as to what caused the incident and allow the reviewer to formulate a plan of action to reduce the severity of or eliminate similar incidents in the future.

Figure 9:
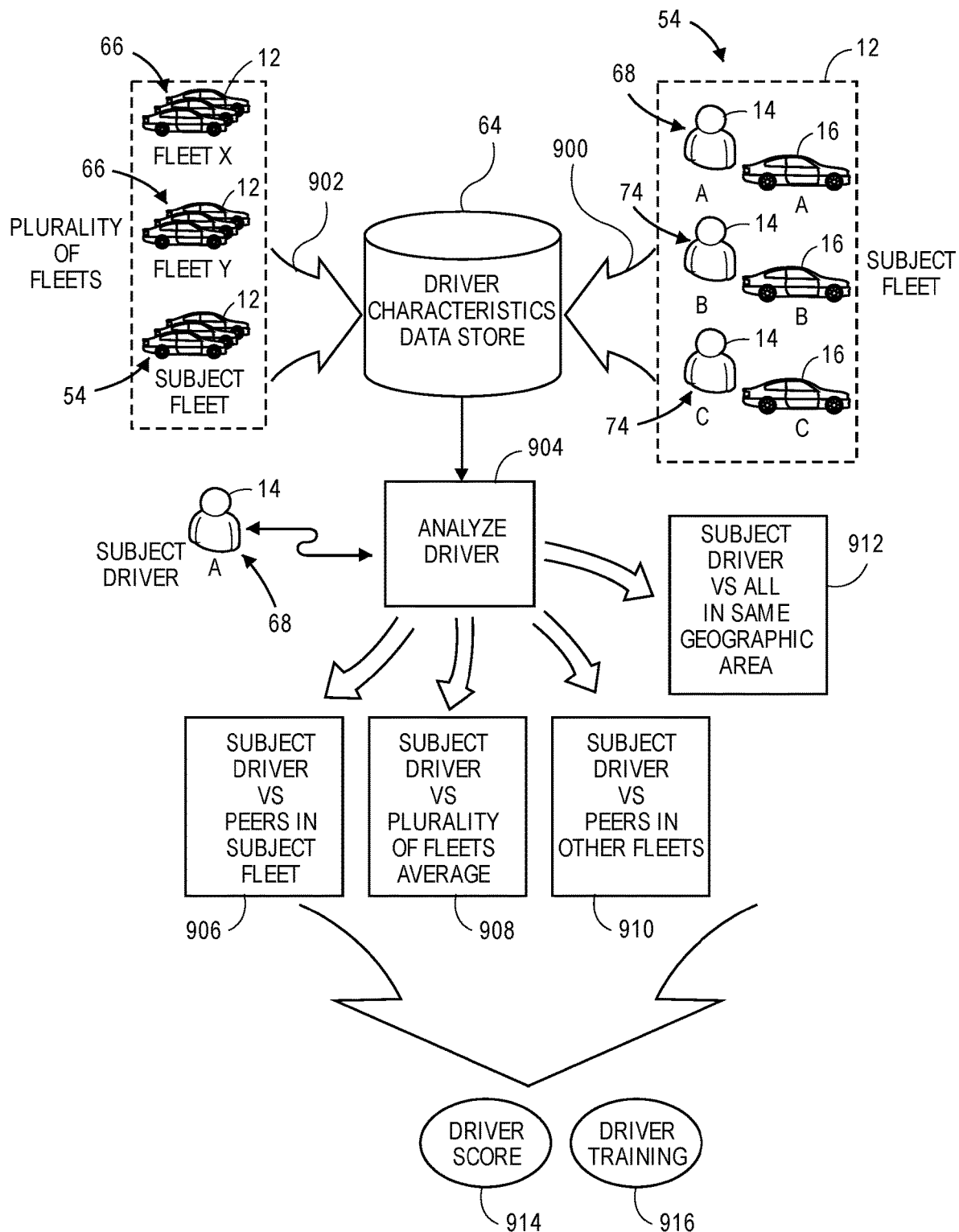
FIG. 9 is a flow diagram illustrating exemplary steps performed by a driver analysis engine.

FIG. 9 depicts exemplary steps of the driver analysis engine. In Step 900, the driver analysis engine acquires information regarding the drivers 14 associated with the subject fleet 54 (i.e. the fleet 12 in which the driver 14 is associated). The information regarding the drivers 14 associated with the subject fleet 54 can include any of the above-discussed information or the like (e.g. hours worked, miles traveled, incidents recorded, etc.). The driver analysis engine stores this information in a driver characteristics data store 64.

In Step 902, the driver analysis engine acquires information related to additional peer fleets 66 (discussed below) beyond the subject fleet 54. In some embodiments, the driver analysis engine stores the information related to all of the fleets 12 in the driver characteristics data store 64. In other embodiments, the driver analysis engine accesses external driver characteristics data stores 64 without transferring data. The information transferred in Step 902 may be redacted, summarized, and/or analyzed (so as to avoid breaches of confidentiality between unaffiliated fleets while still providing analytical benefits).

In Step 904, the driver analysis engine analyzes a subject driver 68 based upon the information received or otherwise acquired. The driver analysis engine receives and analyzes the information that relates to the subject driver 68 and in comparison to other drivers as discussed below. The driver analysis engine organizes and analyzes the data to provide meaningful metrics to the supervisor. The metrics can include incidents per mile, incident severity average, incident cause average, idle time, work time, travel time, analytics of the various metrics, etc.

Figure 10:
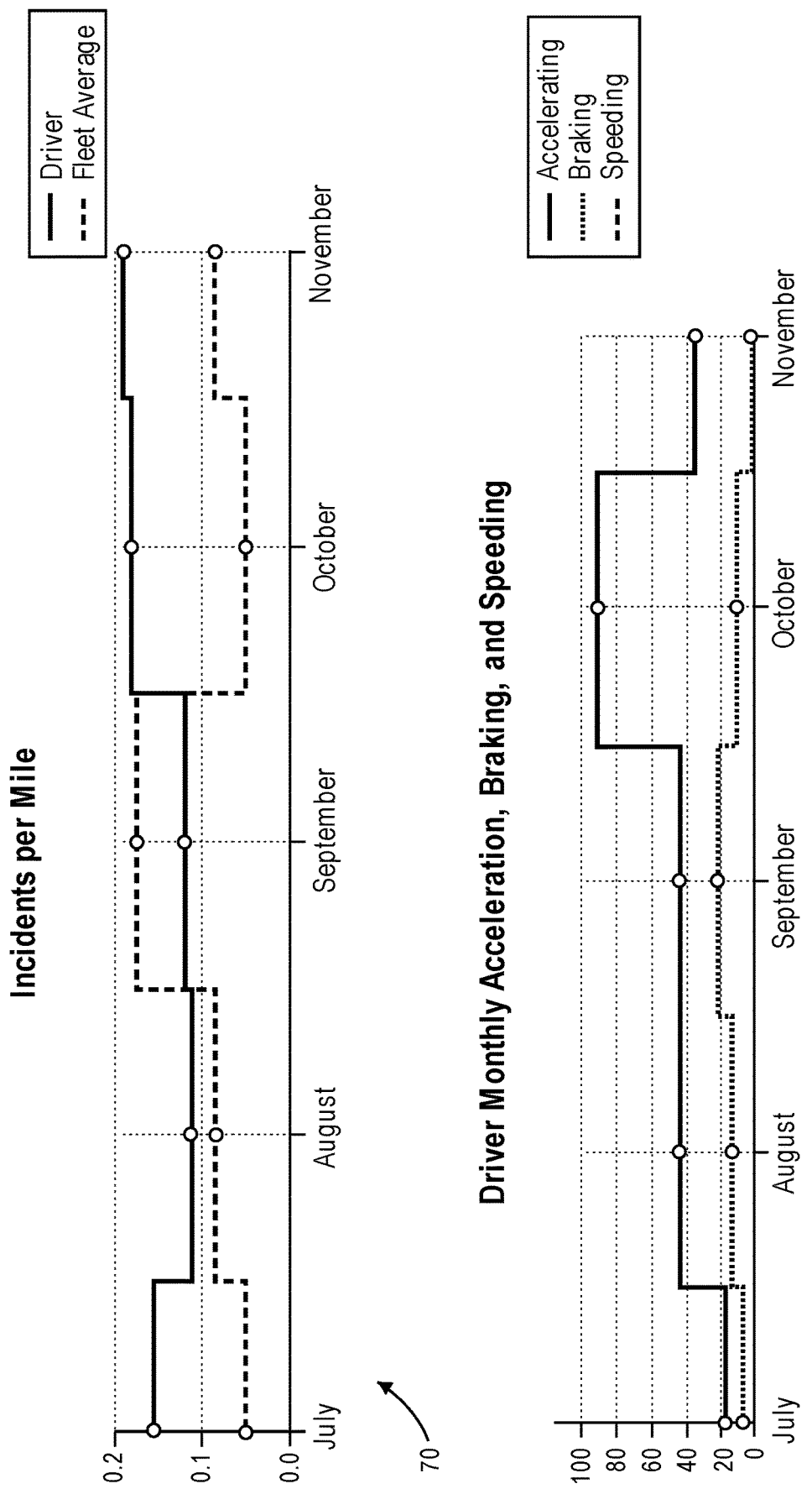
FIG. 10 is a chart diagram illustrating an exemplary driver analysis.

A simple exemplary depiction of the results of this analysis is illustrated in FIG. 10. FIG. 10 depicts a chart showing the recorded information relevant to the subject driver 68 over the past few months. A top chart 70 on FIG. 10 depicts the recorded incidents related to the driver per mile travelled. The top chart 70 also depicts the fleet average value for the same time periods. A bottom chart 72 on FIG. 10 depicts a few exemplary types of incidents as recorded for the subject driver 68 over the same time period. The exemplary types of incidents depicted in FIG. 10 include excessive acceleration, excessive braking, and speeding over the posted speed limit. In other embodiments, the interval on the figures may be weekly, daily, etc.

Returning to FIG. 9, in some embodiments of the invention the driver analysis engine performs a more detailed analysis to determine trends in the incidents of the subject driver 68. For example, the driver analysis engine may determine that the majority of incidents occur in the last hour of the driver's shift (based upon an analysis of the driver's shift times and the incident time), during bad weather (based upon an analysis of available weather data), after nightfall (based upon an analysis of daylight hours), when the subject driver 68 is not carrying a load (based upon route information), after a switch to a new type of vehicle, etc. This analysis is performed substantially independently of a comparison to other drivers 14 and peer fleets 66. However, the significance of this analysis may be even more relevant when compared to similar analyses of other drivers 14 and fleets 12 as discussed below.

In Step 906 the driver analysis engine compares the subject driver 68 to peer drivers 74 in the subject fleet 54. The peer drivers 74 are typically operating in the same types of vehicles, in the same geographic areas, and in the same conditions as the subject driver 68. Comparing the subject driver 68 to the peer drivers 74 therefore provides a more useful analysis than considering the subject driver's performance in isolation.

One exemplary depiction of the result of this analysis is shown in the top chart 70 of FIG. 10. The "fleet average" chart value is a form of comparison between the subject driver 68 and the peer drivers 74. Other comparisons may be more detailed (including all or a plurality of the peer drivers 74). Another exemplary depiction of the result of this analysis is shown in FIG. 9. FIG. 9 depicts drivers 14 within the subject fleet 54 along with totals and average values for the various types of incidents detected by the vehicle-tracking device 18. An analysis can be found in the "Risk Grade" value that approximates an amount of risk that the subject driver 68 takes during the operation of the vehicle.

Returning again to FIG. 9, in Step 908 the driver analysis engine compares the subject driver 68 to an average value across a plurality of fleets 12. For example, the driver analysis engine may rank the subject driver 68 against all peer drivers 74 in all fleets 12. This gives information to the actual effectiveness of the subject driver 68. If the subject fleet 54 to which the subject driver 68 is associated is above or below average, this metric provides a more standardized and stable benchmark.

In Step 910, the driver analysis engine may compare the subject driver 68 to peer drivers 74 in other peer fleets 66. For example, an ambulance driver may be compared to all ambulance drivers in all peer fleets 66. Some fleets 12 comprise different types of vehicles within the fleet 12. Accordingly, it may not be an accurate comparison to compare the subject driver 68 against all drivers 14 in the fleet 12 because certain drivers 14 in the fleet 12 drive different vehicles 16 under different conditions than the subject driver 68. However, only comparing the subject driver 68 against similar drivers in the same fleet 12 reduces the comparison pool. Therefore, in embodiments of the invention, the driver analysis engine compares the subject driver 68 to comparable drivers 14 in both the subject fleet 54 and in peer fleets 66. For example, a squadron of military aircraft may have a single refueling aircraft along with multiple fighter aircraft. It would be of little value to compare the subject driver 68 (i.e. the pilot) of the refueling aircraft against the fighter aircraft pilots. A more valuable comparison would be to compare the pilot of the refueling aircraft against the pilots of other refueling aircraft in other squadrons. Similarly, in the law enforcement field, comparing the driving habits of a detective against patrol officers would not be as advantageous as comparing the detective to other detectives in the same precinct and in other precincts.

In Step 912, the driver analysis engine compares the subject driver 68 against all peer drivers 74 in the same geographic area. For example, if the subject driver 68 primarily drives on a certain route, the driver analysis engine may compare the subject driver 68 against all other drivers 14 (regardless of fleet) on that certain route. For example, if many drivers 14 register an incident rounding a certain turn on the route, the subject driver 68 may be less-severely penalized for incidents along the route because registering of the incident may be anomalous.

In Step 914, the driver analysis engine produces a driver score, a driver report, or other grade. The driver score may be detailed, in that it includes a sub-score for many different areas. The driver score may also be a single value that is calculated based upon the sub-scores. In some embodiments, the driver analysis engine may weight various sub-scores based upon their importance, their departure from the averages, etc. For example, if the subject driver 68 performs well in all areas except having numerous excessive accelerations, the driver analysis engine may weight the excessive accelerations as more important when calculating the driver score.

In Step 916, the driver analysis engine determines, recommends, and/or creates driver training to address identified deficiencies. The driver training can be in numerous forms including multi-media, education, driving simulation, and the like.

In some embodiments, the driver analysis engine may compare an entire fleet 12 of drivers 14 against another entire peer fleet 66. As depicted in FIG. 11, the fleet analysis provides the supervisor or dispatcher with information as to the overall performance of the subject fleet 54 and may additionally recommend driver training for the collective drivers of the subject fleet 54.

The computer program of embodiments of the invention will now be discussed. The computer program comprises a plurality of code segments executable by a computing device for performing the steps of various methods of the invention. The steps of the method may be performed in the order discussed, or they may be performed in a different order, unless otherwise expressly stated. Furthermore, some steps may be performed concurrently as opposed to sequentially. Also, some steps may be optional. The computer program may also execute additional steps not described herein. The computer program, system, and method of embodiments of the invention may be implemented in hardware, software, firmware, or combinations thereof, which broadly comprises server devices, computing devices, and a communications network.

The computer program of embodiments of the invention may be responsive to user input. As defined herein user input may be received from a variety of computing devices including but not limited to the following: desktops, laptops, calculators, telephones, smartphones, smart watches, in-car computers, camera systems, or tablets. The computing devices may receive user input from a variety of sources including but not limited to the following: keyboards, keypads, mice, trackpads, trackballs, pen-input devices, printers, scanners, facsimile, touchscreens, network transmissions, verbal/vocal commands, gestures, button presses or the like.

The server devices and computing devices may include any device, component, or equipment with a processing element and associated memory elements. The processing element may implement operating systems, and may be capable of executing the computer program, which is also generally known as instructions, commands, software code, executables, applications ("apps"), and the like. The processing element may include processors, microprocessors, microcontrollers, field programmable gate arrays, and the like, or combinations thereof. The memory elements may be capable of storing or retaining the computer program and may also store data, typically binary data, including text, databases, graphics, audio, video, combinations thereof, and the like. The memory elements may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), and the like, or combinations thereof. In addition to these memory elements, the server devices may further include file stores comprising a plurality of hard disk drives, network attached storage, or a separate storage network.

The computing devices may specifically include mobile communication devices (including wireless devices), work stations, desktop computers, laptop computers, palmtop computers, tablet computers, portable digital assistants (PDA), smart phones, and the like, or combinations thereof. Various embodiments of the computing device may also include voice communication devices, such as cell phones and/or smart phones. In preferred embodiments, the computing device will have an electronic display operable to display visual graphics, images, text, etc. In certain embodiments, the computer program facilitates interaction and communication through a graphical user interface (GUI) that is displayed via the electronic display. The GUI enables the user to interact with the electronic display by touching or pointing at display areas to provide information to the system 10.

The communications network may be wired or wireless and may include servers, routers, switches, wireless receivers and transmitters, and the like, as well as electrically conductive cables or optical cables. The communications network may also include local, metro, or wide area networks, as well as the Internet, or other cloud networks. Furthermore, the communications network may include cellular or mobile phone networks, as well as landline phone networks, public switched telephone networks, fiber optic networks, or the like.

The computer program may run on computing devices or, alternatively, may run on one or more server devices. In certain embodiments of the invention, the computer program may be embodied in a stand-alone computer program (i.e., an "app") downloaded on a user's computing device or in a web-accessible program that is accessible by the user's computing device via the communications network. As used herein, the stand-along computer program or web-accessible program provides users with access to an electronic resource from which the users can interact with various embodiments of the invention.

In embodiments of the invention, users may be provided with different types of accounts. Each type of user account may provide their respective users with unique roles, capabilities, and permissions with respect to implementing embodiments of the invention. For instance, the driver may be provided with a driver account that permits the driver to access embodiments of the invention that are applicable to log work hours, review incidents, access driver training, etc. Additionally, the dispatcher or supervisor may be provided with a supervisory account that permits the dispatcher or supervisor to access embodiments of the invention that are applicable to monitoring the activities of the fleet, reviewing incidents, requesting video data, etc. In addition, any number and/or any specific types of account are provided to carry out the functions, features, and/or implementations of the invention. Upon the user logging in to the electronic resource for a first time, they may be required to provide various pieces of identification information to create their respective accounts. Such identification information may include, for instance, personal name, business name, email address, phone number, or the like. Upon providing the user may be required to enter (or may be given) a username and password, which will be required to access the electronic resource.

Execution of the computer program of embodiments of the invention performs steps of the method of embodiments of the invention. Because multiple users may be updating information stored, displayed, and acted upon by the computer program, information displayed by the computer program is displayed in real-time. "Real-time" as defined herein is when the processing element of the system 10 performs the steps less than every 1 second, every 500 milliseconds, every 100 milliseconds, or every 16 milliseconds.

Figure 13:
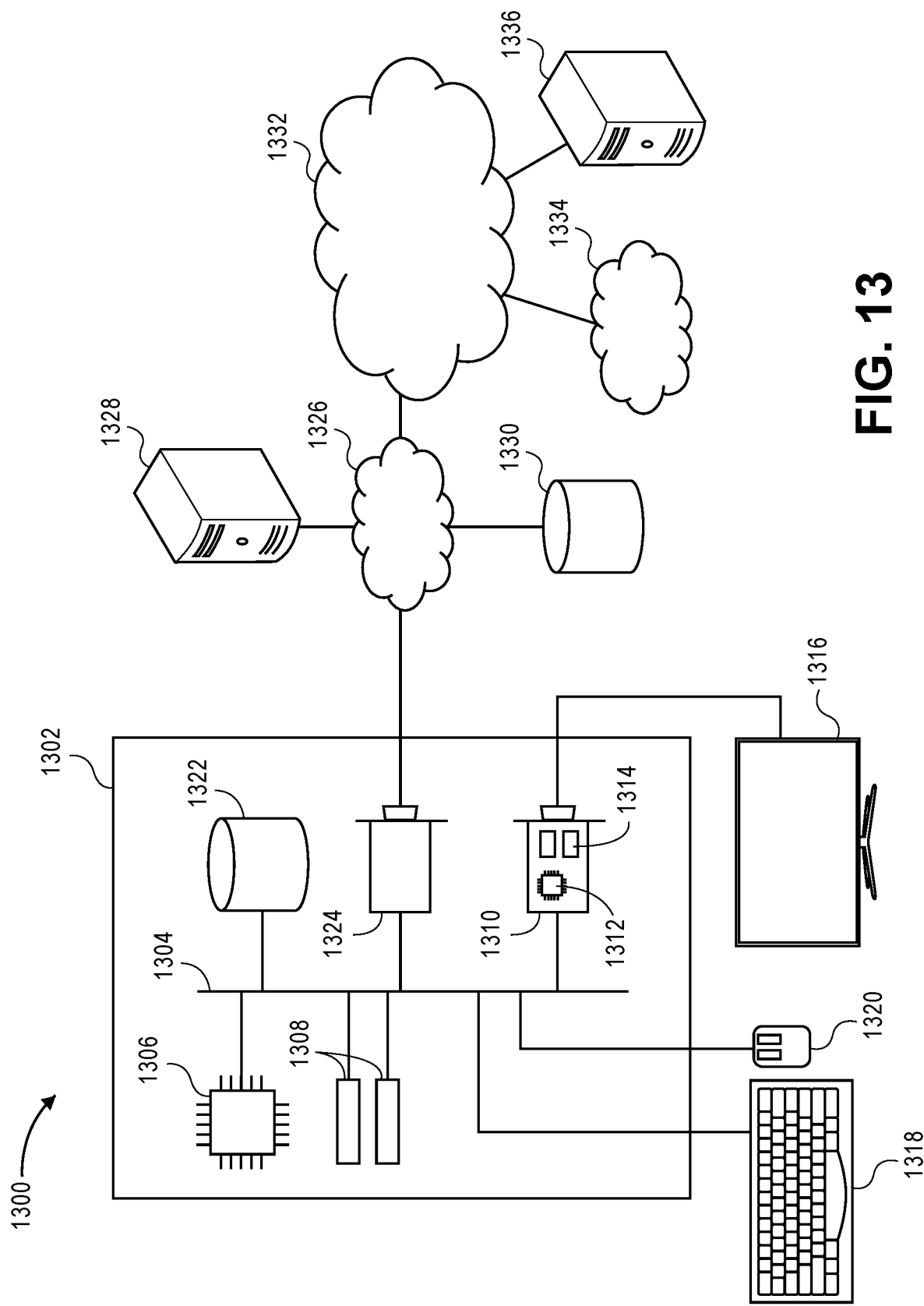
FIG. 13 is a system diagram of an embodiment of the invention depicting various computing devices and their components.

Turning to FIG. 13, an exemplary hardware platform 1300 that can serve as, for example, the control circuitry or other elements of certain embodiments of the invention is depicted. Computer 1302 can be a desktop computer, a laptop computer, a server computer, a mobile device such as a smartphone or tablet, or any other form factor of general- or special-purpose computing device. Depicted with computer 1302 are several components, for illustrative purposes. In some embodiments, certain components may be arranged differently or absent. Additional components may also be present. Included in computer 1302 is system bus 1304, whereby other components of computer 1302 can communicate with each other. In certain embodiments, there may be multiple busses or components may communicate with each other directly. Connected to system bus 1304 is central processing unit (CPU) 1306. Also attached to system bus 1304 are one or more random-access memory (RAM) modules.

Also attached to system bus 1304 is graphics card 1310. In some embodiments, graphics card 1304 may not be a physically separate card, but rather may be integrated into the motherboard or the CPU 1306. In some embodiments, graphics card 1310 has a separate graphics-processing unit (GPU) 1312, which can be used for graphics processing or for general purpose computing (GPGPU). In some embodiments, GPU 1312 may be used for encoding, decoding, transcoding, or compositing video. Also on graphics card 1310 is GPU memory 1314. Connected (directly or indirectly) to graphics card 1310 is display 1316 for user interaction. In some embodiments no display is present, while in others it is integrated into computer 1302. Similarly, peripherals such as keyboard 1318 and mouse 1320 are connected to system bus 1304. Like display 1316, these peripherals may be integrated into computer 1302 or absent. Also connected to system bus 1304 is local storage 1322, which may be any form of computer-readable media, and may be internally installed in computer 1302 or externally and removeably attached.

Finally, network interface card (NIC) 1324 is also attached to system bus 1304 and allows computer 1302 to communicate over a network such as network 1326. NIC 1324 can be any form of network interface known in the art, such as Ethernet, ATM, fiber, or Wi-Fi (i.e., the IEEE 802.11 family of standards). NIC 1324 connects computer 1302 to local network 1326, which may also include one or more other computers, such as computer 1328, and network storage, such as data store 1330. Local network 1326 is in turn connected to Internet 1332, which connects many networks such as local network 1326, remote network 1334 or directly attached computers such as computer 1336. In some embodiments, computer 1302 can itself be directly connected to Internet 1332.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method for analyzing a driver associated with a fleet of vehicles, the method comprising:
   obtaining, by a vehicle tracker, incident information associated with driving characteristics of a vehicle driven by the driver,
   wherein the vehicle is one of the fleet of vehicles;
   generating metadata information for a real-time video, the metadata information associated with the driver and the driving characteristics;
   embedding the metadata information with one or more frames of the real-time video,
   wherein the metadata information is associated with the vehicle tracker and is indicative of the incident information;
   transmitting, to a driver monitoring engine, the real-time video and the metadata information from the vehicle tracker associated with the vehicle of the fleet;
   receiving, from the driver monitoring engine, the real-time video and the metadata information from the vehicle tracker associated with the vehicle,
   using a driver analysis engine:
      determining incidents associated with the driver;
      determining risk for the driver based on the incidents;
      generating one or more incident reports including an incident location and the incidents; and
      determining a driver score indicative of the risk the driver takes while driving;
   receiving a request from a supervisor to view a driver profile of the driver;
   generating, using the driver analysis engine, the driver profile including at least the driver score, the real-time video including the metadata information from the vehicle tracker;
   sending the driver profile to the supervisor; and
   updating the driver profile in real-time.

2. The method of claim 1, wherein sending the driver profile to the supervisor causes each of the one or more incident reports to appear on a map in a location corresponding to the incident location.

3. The method of claim 1, wherein the real-time video and the metadata information from the vehicle tracker is authenticated by a proximity tag worn by the driver.

4. The method of claim 1, wherein the driver score is based in part on a comparison between the driver and one or more additional drivers associated with the fleet.

5. The method of claim 1, further comprising generating a recommended training for the driver based on the driver score, the recommended training comprising at least the real-time video and the metadata information.

6. The method of claim 1,
   wherein the incident information includes a video recording associated with the incident location and the incident information;
   wherein the video recording includes the metadata information and the metadata information further comprises information indicative of a geographic orientation of the video recording.

7. The method of claim 1, wherein the incident information includes a vehicle status.

8. One or more computer-readable media storing computer-executable instructions that, when executed by at least one processor, perform a method of monitoring driving performance, the method comprising:
   obtaining, by a vehicle tracker, incident information associated with driving characteristics of a vehicle driven by a driver;
   receiving, by a driver monitoring engine, a real-time video a real-time driving information, and metadata information from a vehicle monitor associated with the vehicle,
   embedding the metadata information with one or more frames of the real-time video,
   wherein the metadata information is associated with the vehicle tracker and is indicative of the incident information;
   wherein the vehicle is associated with the driver and the metadata information includes one or more incident reports including an incident location and the incident information;
   based on the real-time video, the real-time driving information, and the metadata information, calculating a driver score corresponding to driver safety while the driver is driving;
   receiving a request from a user to view a driver profile corresponding to the driver;
   generating, by a driver analysis engine, the driver profile, the driver profile containing the driver score, the real-time video including the embedded metadata information, and the real-time driving information;
   sending the driver profile to the user; and
   updating the driver profile in real-time.

9. The one or more computer-readable media of claim 8, wherein sending the driver profile to the user causes each of the one or more incident reports to appear on a map in a location corresponding to the incident location.

10. The one or more computer-readable media of claim 8, wherein the metadata information is authenticated by a proximity tag worn by the driver.

11. The one or more computer-readable media of claim 8, wherein the driver score is based in part on a comparison between the driver and one or more additional drivers associated with a fleet of vehicles.

12. The one or more computer-readable media of claim 8,
    wherein the method further comprises generating a plurality of recommended trainings for the driver, at least one of the plurality of recommended trainings comprising the real-time video, the real-time driving information, and the metadata information,
    wherein the driver profile further includes the plurality of recommended trainings.

13. The one or more computer-readable media of claim 8, wherein the incident information includes a video recording associated with the incident location and the incident information.

14. The one or more computer-readable media of claim 8, wherein the incident information includes a vehicle status.

15. A system for tracking driver performance, the system comprising:
    one or more sensors configured to detect driving characteristics of a vehicle of a fleet of vehicles;
    a vehicle monitoring camera associated with the vehicle and a driver of the vehicle, the vehicle monitoring camera configured to transmit, in real time, one or more incident videos and metadata information embedded with one or more frames of the one or more incident videos to a driver monitoring engine,
    wherein the metadata information is associated with the one or more sensors and is indicative of one or more incidents; and
    at least one processor programmed to perform a method of tracking and displaying the driver performance, the method comprising:

receiving the one or more incident videos and the metadata information from the driver monitoring engine, wherein the metadata information is indicative of incident information comprising at least an incident location associated with the one or more incident videos;

determining, using a driver analysis engine, the one or more incident videos, and the metadata information, a driver score;

receiving a request from a user to view a driver profile of the driver;

generating, using the driver analysis engine, the driver profile including at least the driver score, and the one or more incident videos including the embedded metadata information;

sending the driver profile to the user; and updating the driver profile in real time.

16. The system of claim 15, wherein the system further comprises:

a proximity tag worn by the driver which communicates with the vehicle monitoring camera to associate the one or more incident videos with the driver.

17. The system of claim 16, wherein the proximity tag authenticates the one or more incident videos.

18. The system of claim 15, wherein the driver score is based in part on a comparison between the driver and one or more additional drivers associated with the fleet.

19. The system of claim 15, wherein the method further comprises generating a plurality of recommended trainings for the driver, at least one of the plurality of recommended trainings comprising the one or more incident videos and the metadata information, wherein the driver profile further includes the plurality of recommended trainings.

20. The one or more computer-readable media of claim 8, wherein the incident information includes a vehicle status corresponding to one or more attributes of the vehicle.

* * * * *